Figure 1:
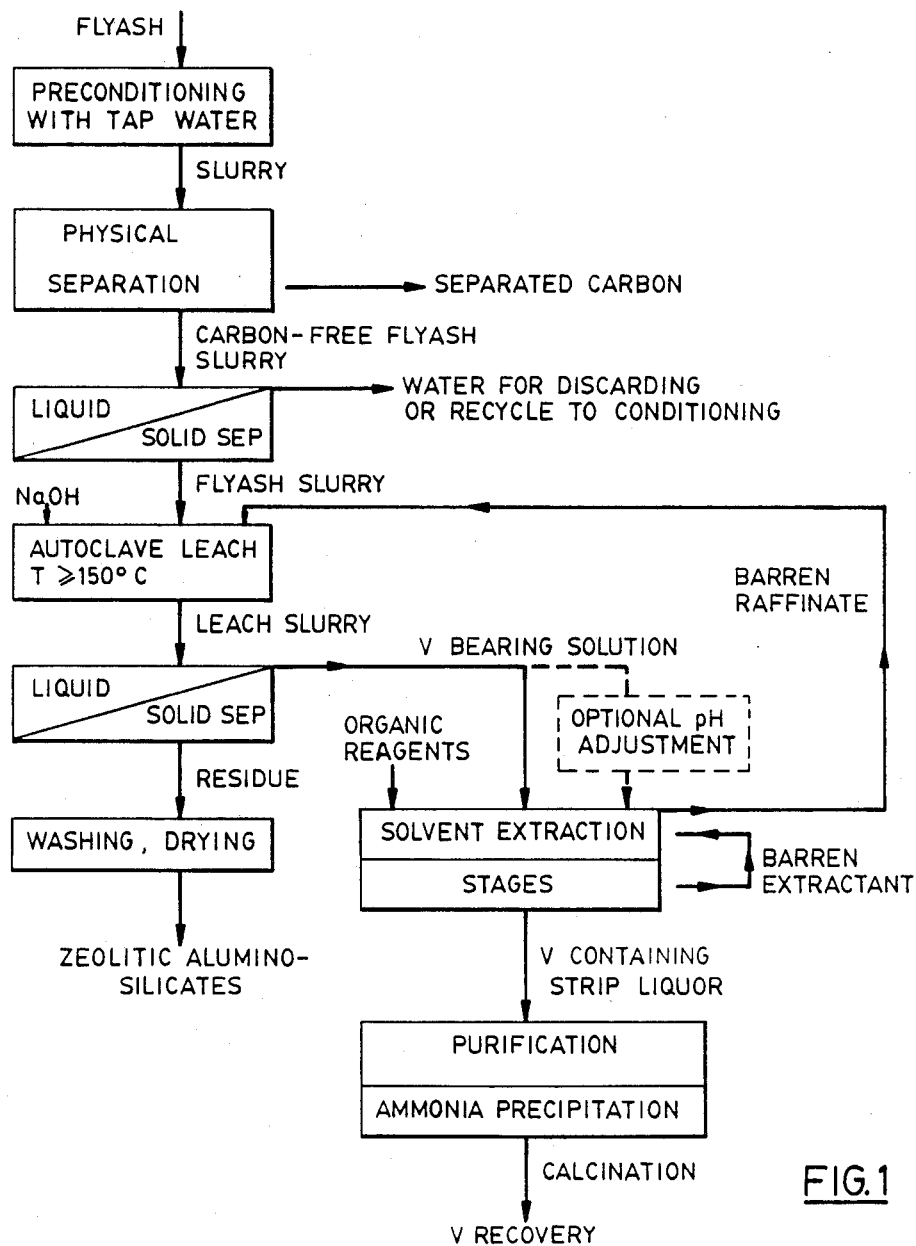

United States Patent [19]

Lakshmanan et al.

[11] Patent Number: 4,798,709
[45] Date of Patent: Jan. 17, 1989

[54] PROCESS FOR TREATMENT OF FLYASH

[75] Inventors: Vaikuntam I. Lakshmanan, Mississauga; Dzinsars Melnbardis, Rexdale; Robert A. Geisler, North York, all of Canada

[73] Assignee: Carbovan Inc., Mississauga, Canada

[21] Appl. No.: 59,363

[22] Filed: Jun. 8, 1987

[30] Foreign Application Priority Data

Sep. 8, 1986 [CA] Canada ................................. 517717

[51] Int. Cl.$^4$ ............................................. C01G 31/00
[52] U.S. Cl. .................................... 423/63; 75/101 R; 209/2; 209/10; 423/68; 423/118
[58] Field of Search ............. 75/101 R, 97 A; 423/62, 423/328, 328 C, 63, 68; 209/2, 10

[56] References Cited

U.S. PATENT DOCUMENTS

| | | | |
|---|---|---|---|
| 3,083,085 | 3/1963 | Lewis et al. | 423/63 |
| 3,206,276 | 9/1965 | Burwell et al. | 423/63 |
| 3,293,004 | 12/1966 | Musgrove et al. | 423/62 |
| 3,345,126 | 10/1967 | Biechler et al. | 423/63 |
| 3,734,696 | 5/1973 | Lucid et al. | 423/63 |
| 4,039,404 | 8/1977 | Richards et al. | 75/119 |
| 4,121,945 | 10/1978 | Hurst et al. | 106/288 B |
| 4,320,097 | 3/1982 | Brown et al. | 423/62 |
| 4,344,924 | 8/1982 | Lucas et al. | 423/63 |
| 4,425,228 | 1/1984 | Lynn et al. | 209/2 |
| 4,426,282 | 1/1984 | Aunsholt | 106/288 B |
| 4,529,133 | 7/1985 | Wall | 209/10 |
| 4,640,823 | 2/1987 | Goddard | 423/63 |
| 4,666,685 | 5/1987 | Wiewiorowski | 423/62 |
| 4,670,229 | 6/1987 | Wiewiorowski et al. | 423/62 |

FOREIGN PATENT DOCUMENTS

| | | | |
|---|---|---|---|
| 783006 | 4/1968 | Canada | 423/62 |
| 885925 | 11/1971 | Canada | 423/62 |
| 995011 | 8/1976 | Canada | 423/62 |
| 6149313 | 11/1981 | Japan | 423/328 C |
| 71527 | 4/1985 | Japan | 423/63 |
| 191018 | 9/1985 | Japan | 423/328 C |

OTHER PUBLICATIONS

Bailar et al, editors, "Comprehensive Inorganic Chemistry", Pergamon Press, 1973, 1st ed., vol. 3, p. 513.
Lo et al, editors, "Handbook of Solvent Extraction", John Wiley and Sons, Inc., 1983, pp. 702-707.

Primary Examiner—John Doll
Assistant Examiner—Wayne A. Langel
Attorney, Agent, or Firm—Rogers, Bereskin & Parr

[57] ABSTRACT

A process is described for recovering vanadium and zeolitic alumino-silicates from flyash and similar carbon-bearing heat treated materials. The process includes steps for the separation of carbon, followed by pressure leaching the carbon-depleted flyash in relatively dilute alkali metal hydroxide solutions at elevated temperatures. The leach liquor is separated from the residue and is subsequently treated in an amine containing solvent extraction process step for vanadium recovery, and optionally, for other metals present in the leach liquor. The vanadium in the strip liquor is precipitated to obtain vanadium containing compounds.

The leach residue is treated separately to recover zeolitic alumino-silicates therefrom.

8 Claims, 1 Drawing Sheet

PROCESS FOR TREATMENT OF FLYASH

This invention relates to the field of treatment of flyash and similar carbonaceous source materials by hydrometallurgical processes to recover vanadium and zeolitic alumino-silicates.

Flyash is the brproduct of treated petroleum or similar carbonaceous fuel materials, which is usually of very fine particle size and is often collected in electrostatic precipitators or air filters used in the fuel processing plants. The flyash is usually composed of various metals and silicates originally present in the carbonaceous fuel intermixed with fine carbon. Another type of material which may be treated in the present process is the residues obtained in petroleum refining processes. Such residues are usually of small particle size, or may be ground before they are subjected to the recovery process described herein. These source materials all contain carbon and have been previously heat treated and will be referred to in the description hereinafter as carbon-bearing heat treated particles.

Vanadium which is contained in materials such as flyash, oil residue and similar carbon bearing source materials, often has useful applications such as in catalysts and in high purity alloys. The purity of vanadium to be used in such applications has great importance.

Several processes are known for obtaining vanadium by high temperature roasting vanadium bearing materials in presence of sodium chloride; this process is known as salt roasting process. The salt roasted calcine is subsequently leached with an alkaline or an acidic solution. To obtain a calcine from which the vanadium can subsequently be recovered, the carbon in the source materials has to be eliminated prior to the roasting process. A salt roasting process is described, for example, in Canadian Patent No. 995,011, issued to Fox and Litz on Aug. 17, 1976. The operation and practice of a salt roast process incur further costs in installing a scrubber to meet requirements of environmental protection.

In conventional hydrometallurgical processes for the recovery of vanadium, the flyash is leached with sulphuric acid to obtain an impure vanadium pentoxide; a process like this is taught in Canadian Patent No. 783,006 which issued to Vezina et al. on Apr. 16, 1968. The impure vanadium pentoxide is then treated with a sodium carbonate solution under atmospheric conditions, to subsequently precipitate vanadium as ammonium metavanadate. The disadvantage of the sulphuric acid leaching is that all other metals present will be leached together with vanadium, requiring subsequent elaborate purification of the solution in the process for obtaining high purity vanadium.

In another process for the extraction of vanadium from vanadium containing source materials such as vanadium containing slag, the finely ground material is subjected to leaching in a strong sodium hydroxide or potassium hydroxide solution in an autoclave with the injection of an oxygen containing gas at over-atmospheric pressure; as is described in Canadian Patent No. 885,925 issued to Z. Svejda on Nov. 16, 1972. The solution obtained in this process is treated to remove silicates and other impurities, then cooled to precipitate a crystalline alkali metal vanadate. Silicates, aluminates and other alkali soluble metals are present in the leach liquor of the Svejda process which then have to be eliminated by expensive processes. The purification processes often require various separation steps which present additional difficulties inherent in handling a strongly alkaline solution. Such difficulties are further increased by the requirements of the Svejda process of cooling the solution well below 30° C. for precipitating the sodium or potassium vanadate.

There are several known processes for producing zeolites by treating clay-type materials or synthetic zeolites to provide zeolitic catalysts in a suitable matrix. There are no known processes which describe the utilization of flyash for obtaining zeolitic alumino-silicates.

The vanadium extracting processes discussed hereinabove are either not applicable to flyash and to similar fine carbon-bearing particles, or would require the incorporation of several additional process steps and expensive equipment to obtain purified vanadium.

A new process has now been found for recovering both vanadium and zeolitic alumino-silicates from flyash and similar fine carbon-bearing vanadium containing particles and which overcome the disadvantages of the above processes as well.

By one aspect of the invention vanadium is recovered from flyash and similar carbon-bearing heat treated vanadium containing particles in a process comprising the steps of:

(a) wetting carbon-bearing heat treated vanadium bearing particles, then subjecting the wetted particles to a physical separation step to yield a fine carbon product and a substantially carbon-free aqueous slurry;

(b) leaching said slurry at over-atmospheric pressure in an alkali metal hydroxide solution at temperatures between 110° to 300° C. to yield a vanadium-depleted residue and a vanadium containing leach liquor;

(c) subjecting the leach slurry to liquid-solid separation to obtain a vanadium containing leach liquor and a vanadium depleted leach residue;

(d) contacting said leach liquor with at least one quaternary amine bearing extractant in an organic solvent carrier and thereafter the loaded organic solvent extractant with an aqueous solution to produce a vanadium containing aqueous strip liquor and a substantially barren organic solvent extractant; and (e) recovering vanadium containing compounds from said vanadium containing strip liquor.

The residue separated in the pressure leaching process step may be treated for further recovery.

By another aspect of the invention zeolitic alumino-silicates are recovered from flyash and similar carbon-bearing heat treated particles which may also contain other metals such as vanadium, molybdenum and gallium, in a process comprising the steps of:

(a) wetting carbon-bearing heat treated particles, then subjecting the wetted particles to a physical separation step to yield a fine carbon product and a substantially carbon-free alumino-silicates containing aqueous slurry (b) leaching said slurry of alumino-silicates containing particles at over-atmospheric pressure in an alkali metal hydroxide containing solution at temperatures between 110° and 300° C. to obtain an alkaline leach liquor and an alumino-silicate containing residue;

(c) separating said leach liquor of step (b) for further metal recovery; and (d) treating the separated leach residue to recover alumino-silicates therefrom.

FIG. 1 shows the schematic description of the flowsheet of the novel process described herein.

Detailed description of the preferred embodiment of the invention will be illustrated by reference to the flowsheet and further illustrated by working examples.

In the preferred embodiment of the process the flyash and similar carbon-bearing heat treated material to be used as feed stock, is ground to a desirable fineness, such as less than 2 mm diameter, or if the material is already of the required particle size range, it is to be treated as it is. The particles bearing carbon are preconditioned by wetting with tap water, and subsequently subjected to a wet physical separation step. It was found that introducing a prewetting step before the physical separation process step led to more satisfactory separation of the fine carbon product from the flyash particles. The physical separation step may be a conventional wet screening process, or flotation by the use of suitable conventional flotation equipment and conventional flotation agents such as varsol and methyl-iso-butyl carbinol (MIBC), or similar conventional wet separation processes in several stages. The separated carbon is further treated for recovery as shown in the flow diagram of FIG. 1 and the separated aqueous slurry which is the flyash containing fraction may be treated in conventional equipment such as a cyclone separator. The flyash containing fraction either in the form of a cake or in the form of a slurry is then fed to an autoclave or similar pressure resistant container, to be leached in a relatively dilute alkali metal hydroxide solution for a period not exceeding 3 hours at a temperature between 110° to 300° C. The concentration of the alkali metal hydroxide leachant ranges between 0.5 to 5M (Molar or moles/liter). In the preferred embodiment sodium hydroxide is used as the alkali metal hydroxide leachant with a convenient concentration of 28 to 120 grams of sodium hydroxide per liter, which is equivalent to 0.7 to 3 moles per liter (0.7 to 3M). The leach slurry produced by the pressure leach step is cooled and separated in conventional liquid-solid separation equipment.

The vanadium is recovered from the separated leach liquor by a solvent extraction step as indicated in the flowsheet of FIG. 1. The solvent extraction step is understood to comprise an organic reagent which is capable of forming a compound with the metal to be extracted being dissolved in a conventional organic solvent, wherein such organic solvent extractant is brought into contact with the aqueous leach liquor. The flyash or a similar carbon-bearing heat treated material may also contain molybdenum and gallium, and these metals will also report to the leach liquor, which may then be recovered by solvent extraction using a suitable reagent.

The pregnant leach liquor may have a solution pH ranging between 8 to 12.5, depending on the nature and composition of the feed stock. The solvent extractant reagents of the present process will provide satisfactory vanadium recovery in this pH range. For best results, however, a pH range of 8.3 to 10 is preferred, and the pH of the pregnant leach liquor may optionally be adjusted to these values by carbon dioxide addition.

The preferred solvent extracting reagent used in this process is a mixture of a quaternary amine and an oxine in kerosene carrier, together with a suitable amount of iso-decanol or a similar conventional modifier, added to prevent the formation of a third phase. In some cases the application of a quaternary amine by itself in kerosene as solvent extractant may be sufficient for the recovery of vanadium dissolved in the separated leach liquor. The solvent extraction is conducted in several stages in a conventional manner; the number of stages being dictated by convenience. The solvent extractant composed of at least a quaternary amine dissolved in kerosene and isodecanol, now loaded with most of the vanadium contained in the leach liquor is stripped with an aqueous solution, preferably a sulphuric acid solution. Substantially all the vanadium in the loaded solvent extractant liquid has now been transferred to the strip liquor. The barren aqueous raffinate after having been separated from the loaded solvent extractant is regenerated and made up by alkali metal hydroxide reagent for recycling to leach fresh flyash. The barren aqueous raffinate is understood to refer to the leach liquor from which the leached metals have been removed by the organic solvent extractant.

The strip liquor generated in the solvent extraction process is purified and then treated for vanadium recovery in a conventional manner, such as precipitating as ammonium vanadate and calcining to obtain vanadium pentoxide. The strip liquor which is a sulphuric acid solution in the preferred embodiment is neutralized with ammonia to recover purified vanadium bearing compounds. Other known vanadium recovery processes may also be used.

The barren organic solvent extractant is regenerated by the replenishing of reagents such as quaternary amine, oxine and isodecanol, and is recycled to be used in further extracting of vanadium from fresh leach liquor. The paths of various aqueous and organic liquids which form part of the solvent extraction process are clearly indicated in the flowsheet of FIG. 1.

The separated leach residue is washed and may be further treated by conventional process steps such as drying, to provide a substantially zeolitic alumino-silicate product.

The effectiveness of the process for treating flyash and similar carbon containing heat treated vanadium bearing residues in obtaining purified vanadium or its compounds, and zeolitic alumino-silicates will be better understood by those skilled in the art, by having regard to the following examples which illustrate the working of the process of the present invention.

EXAMPLE 1

This example described the application of the present process to the separation of carbon and recovery of vanadium from flyash.

A commercially available carbon bearing vanadium containing flyash was ground and then wetted with tap water for preconditioning.

The slurry of wetted, ground flyash was subsequently conditioned with the addition of 13.4 pounds per ton varsol and 3.4 pounds per ton MIBC frother, then treated in four flotation stages. The overflow of the flotation stages was treated for carbon recovery. The underflow consisting of carbon depleted vanadium containing fine flyash, was subjected to liquid-solid separation in conventional equipment such as cyclone separator. The cake obtained was repulped to form a slurry of 20 percent pulp density and fed to an autoclave for leaching.

The autoclave leaching of the feed material which in this instance had about 2.6 percent vanadium content, was conducted with sodium hydroxide addition at the rate of 300 pounds of sodium hydroxide per ton of dry solids. This translates to a leach liquor concentration of 0.85M, or 34 grams per liter NaOH at the stated 20 percent pulp density. The leach temperature was maintained at 170° to 200° C. for a period of one hour.

The leach slurry was then cooled to less than 50° C. and filtered. The pregnant leach liquor was clarified and then fed to a solvent extracting circuit. The pH of the clarified leach liquor was adjusted to a value of 9.5 by feeding carbon dioxide gas thereto. The organic solvent extractant used in this process step consisted of 5% by volume quaternary amine, such as Aliquat 336, 5% by volume Isodecanol, and 90% kerosene, marketed under the trade name of Isopar M. The solvent extracting circuit of this example had four stages.

The barren raffinate of the solvent extractor circuit having been separated from the loaded solvent extractant was regenerated by sodium hydroxide additions to the required strength and recycled to leach fresh ground flyash in the autoclave.

The vanadium was stripped with dilute sulphuric acid from the loaded solvent extractant solution and the pregnant strip liquor was purified to remove dissolved silicates.

The purified vanadium containing solution was treated with ammonium hydroxide to precipitate vanadium red cake (ammonium vanadate) which was subsequently calcined to produce substantially pure vanadium pentoxide.

EXAMPLE 2

This example shows the recovery of zeolitic aluminosilicates from the alkaline leach residue of the present process.

The leach residue obtained in the pressure leaching and subsequent filtration step of the process described in Example 1 was washed, dried and analyzed.

The residue was found to contain less than 0.3% vanadium, indicated that approximately 90% of the vanadium contained in the flyash had been extracted.

X-ray diffraction analysis of the washed and dried solid residue showed that it consisted of predominantly zeolitic alumino-silicates in the forms of analcime ($NaAlSi_2O_6 \cdot H_2O$) and sodium zeolite ($Na_3Al_3Si_5O_{16} \cdot 6H_2O$). Zeolites are alumino-silicates with a crystalline structure which may be used as a molecular sieve.

This substantially zeolitic material was tested for catalytic activity and it was found to be highly suitable as a hydrocarbon cracking catalyst. Thus it can be seen that the flyash treatment of the present process provides a zeolitic product which is shown both by chemical and structural analysis to be predominantly zeolitic alumino-silicate.

EXAMPLE 3

This example shows the beneficial effect of preconditioning by tap water in the separation of carbon from flyash when treating flyash according to the process of this invention.

The fine flyash was first wetted by tap water in a preconditioning stage, then varsol and kerosene were added in a conventional flotation equipment and the carbon was collected in the froth. The depressed decarbonized vanadium containing flotation tailings were found to contain less than 3% by weight residual carbon.

When the flyash was treated in a flotation equipment using the same reagents but without the wetting by tap water in a preconditioning stage, the decarbonized tailings were found to contain over 11% by weight residual carbon.

EXAMPLE 4

This example is designed to show the efficacy of the solvent extraction process of the present invention. In the preferred embodiment the clarified alkaline leach liquor following the pressure leaching step is subjected to a solvent extracting process step utilizing a quaternary amine dissolved in kerosene, with the optional addition of an oxine; and in the presence of isodecanol to prevent a third phase formation. The pH of the leach liiquor may be in the range of 8 to 12.5 depending on the composition of the flyash treated, but will have a value of 8.3 to 10 in the preferred embodiment.

To compare the extraction efficiency of the solvent extractant combinations of the present invention, tests were conducted on vanadium containing alkaline solutions of various pH, representing simulated leach liquor. The conditions of the tests conducted on pregnant vanadium-containing solutions, the composition of the solvent extractant and the degree of extraction achieved are tabulated in Table 1 below. The volume ratios of the solvent extractant organic liquid to the volume of the aqueous phase is similar in these tests.

TABLE 1

| pH of pregnant aqueous solution | Organic to aqueous ratio | Quaternary amine vol. % (Aliquat 336) | Isodecanol vol % | Oxine vol % (Kelex 100) | % vanadium extraction from pregnant solution |
|---|---|---|---|---|---|
| | | Balance: Kerosene (Isopar M) | | | |
| 10.8 | 2.5 to 1 | 5 | 5 | — | 94.0 |
| 7.4 | 2.5 to 1 | 5 | 5 | — | 98.0 |
| 12.8 | 2 to 1 | | 5 | 5 | nil |
| 8.3 | 2 to 1 | | 5 | 5 | 0.6 |
| 8.3 | 2 to 1 | 3 | 5 | 3 | >99.0 |

It can be seen that substantially all the vanadium is removed from the pregnant solution by the solvent extractant reagent mixture when the extractant is composed of equal amounts of quaternary amine and an oxine carried by kerosene solvent. Close to complete extraction may be achieved by a quaternary amine alone but only from a near neutral solution. A loss of 6% vanadium is sustained when the pH of the pregnant solution is higher than 10. Thus a solvent extraction step by the use of a quaternary amine reagent as the sole extractant, from a more alkaline solution such as the leach liquor of the present process, may be an acceptable alternative if the loss of small amounts of vanadium in the spent leach liquor is tolerated. The preferred embodiment of the present process, employs alkaline reagents to leach vanadium from the flyash, and the preferred pH of the obtained leach liquor will range between 8.3 to 10, hence the new extractant reagent mixture of quaternary amine and oxine of the preferred embodiment of the present invention is found to be the most suitable extractant in the process.

The solvent extraction process can be conducted in several stages either in concurrent or in countercurrent mode, dictated by convenience.

As shown, Aliquat 336 is the quaternary amine used here, which is reported to contain 8 to 10 carbon atoms. Other suitable quaternary amines such as Adogen 464, may be utilized as well. Both Aliquat 336 and Adogen 464 are marketed by General Mills (Henkel) Company. The oxine derivative used here is sold as Kelex 100, but other chemical equivalents may be substituted.

Kelex 100 is the product of Sherex Chemical (Ashlands) Company.

Although the present invention has been described with reference to the preferred embodiment, it is to be understood that modifications and variations may be resorted to without departing from the spirit and scope of the invention, as those skilled in the art will readily understand. Such modifications and variations are considered to be within the purview and scope of the invention and the appended claims.

We claim:

1. A process for the recovery of vanadium from flyash and similar heat treated carbon-bearing vanadium containing particles, comprising the steps of:
    (a) wetting of carbon bearing heat treated vanadium containing particles, then subjecting the wetted particles to a physical separation step to yield a fine carbon product and a substantially carbon free aqueous slurry;
    (b) leaching said slurry at over-atmospheric pressure in an aqueous alkali metal hydroxide solution of less than 5 moles per liter concentration, at temperatures between 110° to 300° C., to yield a vanadium-containing leach slurry comprising a vanadium-depleted residue;
    (c) subjecting the leach slurry to liquid-solid separation to obtain a vanadium containing leach liquor and a vanadium depleted leach residue;
    (d) contacting said leach liquor with an extractant in an organic solvent carrier, said extractant comprising at least a quaternary amine and an oxine derivative, and thereafter contacting said loaded organic solvent extractant with an aqueous solution to produce a vandium containing aqueous strip liquor and a substantially barren organic solvent extractant; and
    (e) recovering vanadium containing compounds from said vanadium containing strip liquor.

2. A process as recited in claim 1, wherein the concentration of the alkali metal hydroxide solution in step (b) is between 0.5 to 4.5 moles per liter.

3. A process as recited in claim 2 wherein the alkali metal hydroxide is sodium hydroxide, and the solution concentration is between 0.7 to 3 moles per liter.

4. A process as recited in claim 1 wherein the extractant in step (d) is a mixture of a quaternary amine and an oxine derivative, dissolved in kerosene.

5. A process as recited in claim 4 wherein said extractant dissolved in kerosene contains a quaternary amine and an oxine derivative in equal proportions.

6. A process as recited in claim 1 or 4 wherein the aqueous strip liquor in step (d) is a sulphuric acid containing solution.

7. A process as recited in claim 1, wherein the extractant in step (d) is a mixture of a quaternary amine, an oxine derivative and isodecanol dissolved in kerosene.

8. A process as recited in claim 1, wherein the oxine derivative in step (d) is an 8-hydroxyquinoline compound substituted in the 7-position.

* * * * *